F. A. THOMAS.
HORSE DRINKING FOUNTAIN.
APPLICATION FILED SEPT. 23, 1913.
1,111,507.
Patented Sept. 22, 1914.
2 SHEETS—SHEET 1.
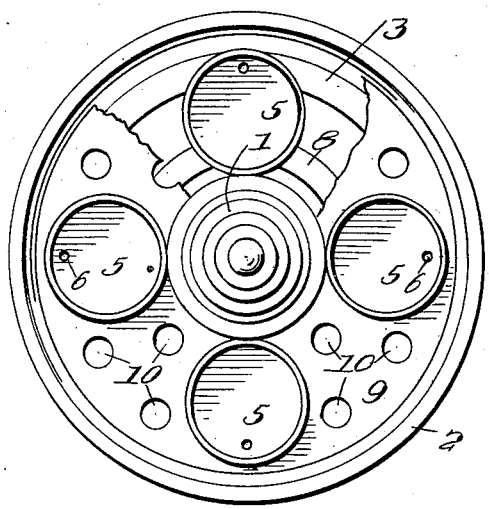
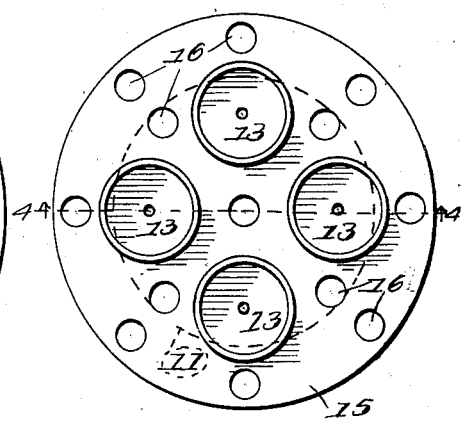
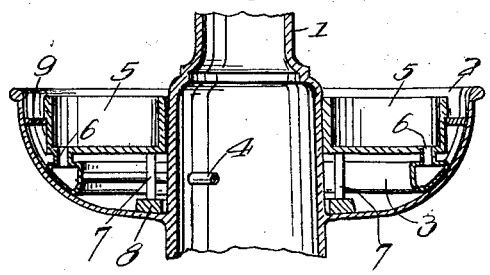
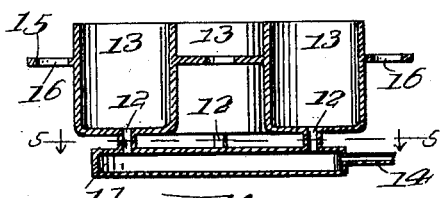
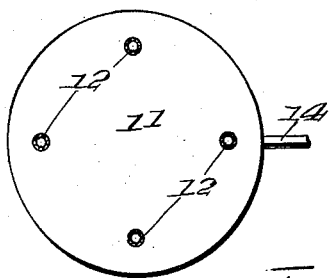
Inventor
Fred A. Thomas
by Joseph A. Miller
Attorney
Witnesses
Ada C. Hagerty
Elsa B. Dana F. A. THOMAS.
HORSE DRINKING FOUNTAIN.
APPLICATION FILED SEPT. 23, 1913.
1,111,507.
Patented Sept. 22, 1914.
2 SHEETS—SHEET 2.
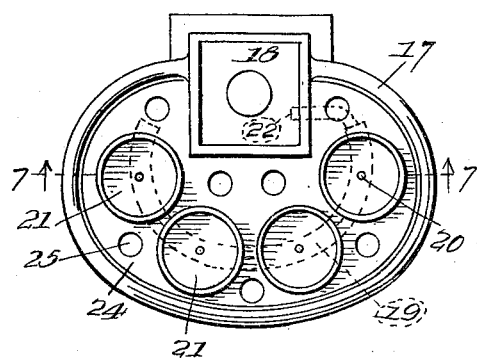
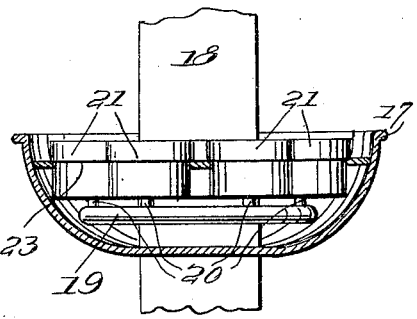
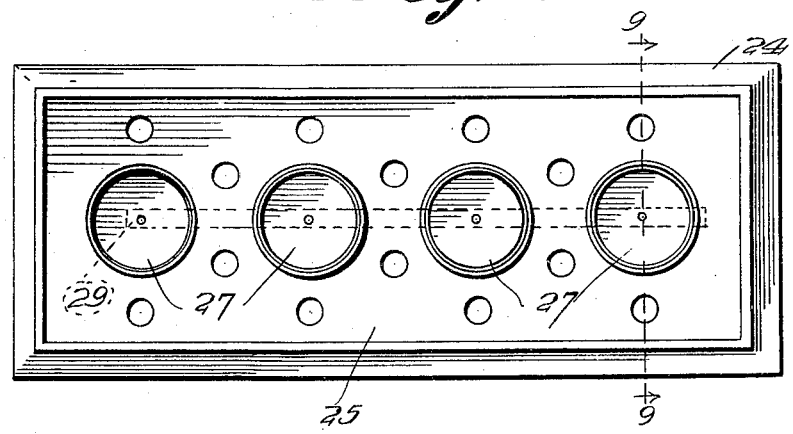
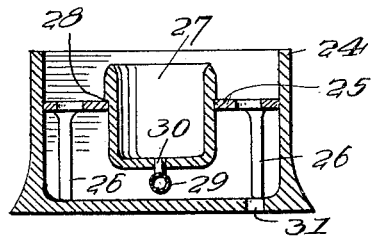

UNITED STATES PATENT OFFICE.

FRED A. THOMAS, OF PAWTUCKET, RHODE ISLAND.

HORSE DRINKING-FOUNTAIN.

1,111,507.  Specification of Letters Patent.  Patented Sept. 22, 1914.

Application filed September 23, 1913. Serial No. 791,397.

*To all whom it may concern:*

Be it known that I, FRED A. THOMAS, a citizen of the United States, residing at Pawtucket, in the county of Providence and State of Rhode Island, have invented a new and useful Improvement in Horse Drinking-Fountains, of which the following is a specification.

This invention relates to certain new and useful improvements in horse drinking fountains, and relates more particularly to means for converting ordinary drinking fountains possessed of a single drinking basin into a fountain which has individual drinking cups for a plurality of animals.

The ordinary drinking fountains are objectionable for the reason that there is no means for carrying off any disease germs or other matter which may be deposited in the body of water by an animal or animals due to the fact that the water in the basin is not permitted to overflow the edges thereof, consequently, more or less germs are always retained in the basin.

Where a fountain is possessed of individual cups located in a main basin and the cups are supplied at their bases with water, and the water is caused to overflow the upper edges of the cups to thereby enter the main basin and be carried off by the latter, it is obvious that each individual cup will be at all times supplied with a fresh body of water, the water in leaving the individual cups continuously washing and cleansing the free edges thereof, so as to provide a maximum sanitary condition of each cup.

Therefore, the present invention has for its primary object means of simple and economical character which allows existing unsanitary fountains to be readily converted into ones which offer maximum sanitary properties.

In the accompanying drawings there are illustrated various means whereby the present invention may be practised, which however are to be considered rather in the light of example than of exhaustive enumeration.

In the drawings—Figure 1 is a top plan view partly broken away of a fountain equipped with the present invention. Fig. 2 is a central vertical sectional view in fragment of Fig. 1. Fig. 3 is a top plan view of a modified form of the invention. Fig. 4 is a section on the line 4—4 of Fig. 3. Fig. 5 is a section on the line 5—5 of Fig. 4. Fig. 6 is a top plan view of a further modified form of the invention. Fig. 7 is a section on the line 7—7 of Fig. 6. Fig. 8 is a top plan view of a still further modification of the invention, and Fig. 9 is a section on the line 9—9 of Fig. 8.

In Figs. 1 and 2 of the drawings, the fountain is shown of the type which includes a central pillar 1 and a basin 2 which parts are common to ordinary fountains, in every day use, and in order to convert the fountain into a sanitary one the following structure is employed: An annular tubular member 3 is employed and connected in any suitable manner to a source of water supply, such as a pipe 4. A series of individual cups 5 are connected by means of short tubes or pipes 6, with the annular member 3, so that the latter may feed water to each of the cups. The ring like member 3 rests on the bottom portion of the basin 2 and is arranged adjacent to the outer side portions of the cup. The inner side portions of the cups may be supported in any suitable manner for instance by legs 7 which depend therefrom and may seat on a ring 8 that is usually formed on the bottom of the basin. By inspection of Fig. 2 of the drawings, it will be seen that the top edges of the cups are located below the top edges of the basin, in order that the water which is fed to the cup interiors may flow over the edges of the cups and down the sides of same to enter the basin, from which latter the water is drained in any suitable manner. A plate 9 is employed, which latter has its periphery supported by frictional contact with the inner circumference of the basin, the plate being provided with a number of openings corresponding to the number of cups employed, the latter passing through the plate as shown in Fig. 2 of the drawings. The plate is disposed below the upper edges of the cups and is provided with a series of perforations 10, which latter allow the water that leaves the cup to pass downwardly to enter the basin and be drained therefrom. The purpose of the plate is to prevent the animals from having access to the bottom portion of the basin, and further to act as a covering for the ring like member 3 and the supporting legs 7 and the other parts. In addition the plate gives a more finished appearance to the fountain and acts to support the individual cup against any possible lateral movement.

In Figs. 3, 4 and 5 of the drawings means is shown to enable the conversion of a completely open circular basin devoid of a pillar or the like, into a fountain possessed of individual cups, in which a substantially drum-like member 11 has a series of concentric nipples 12 projecting upwardly therefrom, the nipples supporting and communicating with the individual cups 13. Water is fed to the drum by means of a supply pipe 14 and the individual cups are connected by an integral plate 15 that is apertured at 16, so as to allow the water that flows over the edges of the cups to pass through the apertures and enter the basin, where it is drained from the basin in any desired manner.

In Figs. 6 and 7 of the drawings the invention is shown applied to a type of fountain in which a substantially C-shaped basin 17 is secured to a supporting pedestal or pillar 18. In this form of the invention an arcual pipe 19 has a series of nipples 20 projecting upwardly therefrom and into the bottoms of the cups 21, the pipe 19 being closed at one end and having its other end provided with an inlet 22 which leads into the pedestal 18 and is connected to any suitable source of supply. The lower end portions of the cups are reduced to provide peripheral shoulders 23 which latter abut the upper face of a plate 24, the plate 24 being shaped to fit the inner circumference of the basin, as shown in Fig. 6 and being provided with water outlets 25. In this form of the invention the cups are individually supported against downward movement by the shoulders 23 as is evident from inspection of Fig. 7.

In Figs. 8 and 9 of the drawings a fountain having a rectangular form of basin 24 is shown. The perforated plate 25 has a rectangular contour to conform to the inner contour of the basin, the plate being supported by legs 26 which seat on the bottom of the basin, and which support the plate at a point below the upper edges of the basin. The plate has openings to receive the individual cups 27 which latter are shouldered at 28 so as to have their downward movement limited with respect to the plate 25. A longitudinal water supply pipe 29 is connected by nipples 30 to the individual cups. The basin has an outlet 31 through which the waste water drains.

From the above it will be observed that the present invention enables ordinary drinking fountains to be converted into ones possessed of sanitary properties, the shape of the fountain basin merely necessitating alteration of the shape of the plate and arrangement of the cups, the latter arrangement involving corresponding change in the shape of the water supply pipe.

Having thus described my invention, I claim as new and desire to secure by Letters Patent;—

1. A device for converting a single basin drinking fountain into one having individual drinking cups, including a perforated plate formed separate from the basin, means to support the plate below the upper edge of the basin of a fountain, a series of independent cups secured to the plate and having their upper edges located above the plate, and common means to supply water to the cups.

2. In a drinking fountain, a perforated plate for disposition below the upper edge of the basin, a series of individual drinking cups secured to the plate and having their ends extending above and below the plate, and means below the plate to supply water to each cup.

3. A device adapted to be placed in the basin of a drinking fountain including a perforated member which extends horizontally and substantially throughout the area of the basin, a series of drinking cups in connection with the member, and means to supply water to the cups.

4. In a device of the type set forth, an apertured plate shaped peripherally to engage the inner circumference of the basin of a drinking fountain, individual cups arranged in said apertures, means below the plate to supply water to each cup, and means whereby the water overflowing from the cups may pass the plate and enter the basin.

5. A device for converting a single basin drinking fountain into one having individual drinking cups including a series of individual cups, and means to both support the cups and to cover the basin bottom to allow the animals to obtain water from the cups only.

6. A device for converting a single basin drinking fountain into one having individual drinking cups including a series of individual cups, and means to both support the cups and to cover the basin bottom to allow the animals to obtain water from the cups only, said means being formed to allow the water which overflows from the cups to contact with the bottom of the basin and said means being arranged above the basin bottom in spaced relation to the latter.

7. A device for use with drinking fountains including a water supply pipe, a series of individual drinking cups each connected to said pipe, and a perforated plate having openings formed to receive the cups, the plate extending below the upper edges of the cups and having a peripheral contour which conforms substantially to that of the fountain basin interior.

8. A device for converting a single basin drinking fountain into one having individual drinking cups, including a series of individual cups adapted to be placed in the basin, and means insertible in the basin and surrounding the cups and arranged over the basin bottom whereby to prevent the animal from having access to the basin bottom.

9. A device for converting a single basin drinking fountain into one having individual drinking cups, including a plate which is insertible in the basin and which has its periphery shaped to generally conform to the shape of the bounding walls of the basin, a series of individual drinking cups which project through the plate, and means to supply water to the cups.

10. A device for converting a single basin drinking fountain into one having individual drinking cups, including a series of individual drinking cups insertible in the basin, and means insertible in the basin and surrounding the cups and arranged to extend to points adjacent to the side walls of the basin to prevent animals from having access to the basin bottom.

In testimony whereof I have signed my name to this specification in the presence of two subscribing witnesses.

FRED A. THOMAS.

Witnesses:
ADA E. HAGERTY,
J. A. MILLER.

---

Copies of this patent may be obtained for five cents each, by addressing the "Commissioner of Patents, Washington, D. C."